United States Patent [19]
Kitayama et al.

[11] 3,918,951
[45] Nov. 11, 1975

[54] APPARATUS FOR SHEARING FLOWING MOLTEN GLASS

[75] Inventors: Teruki Kitayama, Akishima; Hiroaki Takahara, Tachikawa; Hiroshi Ogawa, Hachioji, all of Japan

[73] Assignee: Hoya Glass Works, Ltd., Tokyo, Japan

[22] Filed: May 15, 1974

[21] Appl. No.: 469,974

[30] Foreign Application Priority Data
May 15, 1973   Japan............................ 48-53811

[52] U.S. Cl. ...................... 65/334; 65/133; 65/332
[51] Int. Cl.² ........................................ C03B 5/38
[58] Field of Search...................... 65/133, 332, 334

[56] References Cited
UNITED STATES PATENTS
2,401,994   6/1946   Weber ................... 65/133
FOREIGN PATENTS OR APPLICATIONS
209,221   1/1924   United Kingdom................. 65/334

Primary Examiner—Arthur D. Kellogg
Attorney, Agent, or Firm—Sughrue, Rothwell, Mion, Zinn & Macpeak

[57] ABSTRACT

A method of shearing flowing molten glass comprising nipping the flowing molten glass with a pair of chelae-like V-shaped rotating blades confronting each other in closely adjacent planes and having mutually different rotating radii, thereby to shear the flowing molten glass without squeezing the glass and an apparatus therefore.

5 Claims, 15 Drawing Figures

A    B    C    D

A'   B'   C'   D'

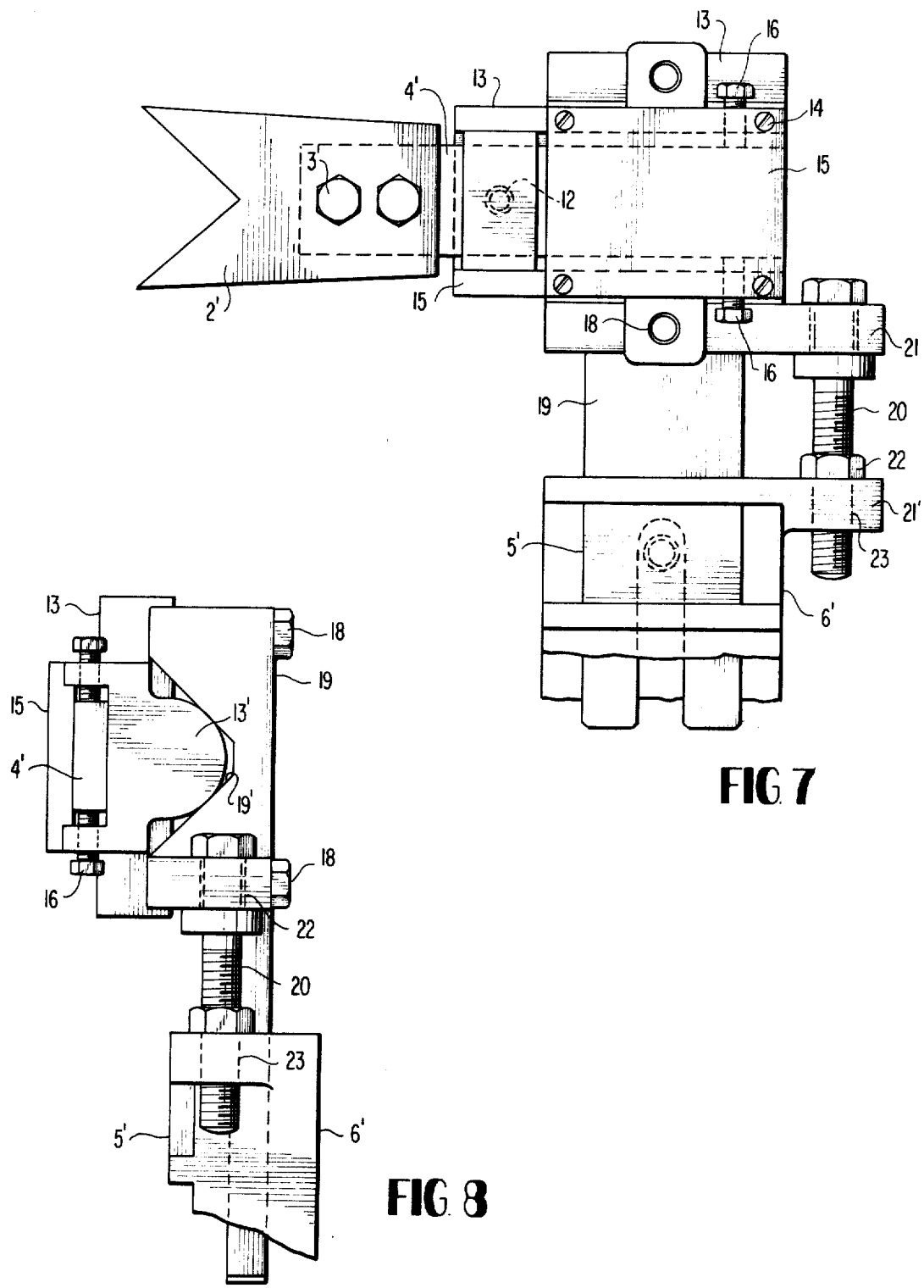

APPARATUS FOR SHEARING FLOWING MOLTEN GLASS

BACKGROUND OF THE INVENTION

1. Field of the Invention

This invention relates to a method of shearing flowing molten glass without causing any "shear marks" or dotted lines of bubbles therein, and also to an apparatus for performing the method.

2. Prior Art of the Invention

Generally, lines (a) shown in FIG. 1, called "shear marks," are formed on the sheared surface of molten glass, when sheared by a conventional shearing machine. On observation, the lines (a) are formed by a series of successive bubbles (b) as shown in FIG. 2. The depth of each bubble is usually 0.3 to 0.5 mm from the sheared surface, and in rare cases, bubbles occur at a depth as deep as about 1 mm. Keeping the depth of the bubble always and consistently less than 0.1 mm using a conventional shearing machine is very difficult, and accordingly, table ware or similar glass products sheared by a conventional shearing machine do not present an attractive appearance, thus resulting in a diminution in commercial value.

Shear marks give rise to difficulties especially in the molding of optical glass. Where the optical glass is to be formed into a lens, a glass flow or rod is usually sheared in a desired amount, and the sheared amount is then pressed into a desired shape, sorted, cut and reheated.

In recent years, molten glass flowing from an orifice is sheared by a shear blade, and the sheared mass is press-formed before cooling and solidification, similar to the conventional glass bottle forming method. Such direct and continuous glass forming from molten flowing glass by shearing of the molten flowing glass eliminates the adhesion of the parting agent to the glass mass and enables the resulting products to be produced consistently in the exact size. However, shear marks are formed on the sheared surface. In order to ensure the removal of the bubbles of the shear marks from the ground lens surface, at least 1 mm of the surface layer must be shaved off. Accordingly, the grinding work of the optical glass results in a large amount of glass chips, requires much time and is costly.

SUMMARY OF THE INVENTION

Therefore, this invention provides a method of shearing the flowing molten glass without causing the above described defects and also provides an apparatus for executing the method.

The method of this invention comprises nipping the flowing molten glass with a pair of chelae-like V-shaped rotating blades confronting each other in closely adjacent planes and having mutually different rotating radii, thereby to shear the flowing molten glass without squeezing the glass.

This invention also provides an apparatus for shearing flowing molten glass comprising a pair of chelae-like V-shaped blades confronting each other and attached to arms having mutually different radii; and means for rotating the arms so that the blades rotate in closely adjacent planes the same plane but in opposite directions with respect to each other.

BRIEF DESCRIPTION OF THE ACCOMPANYING DRAWINGS

FIG. 7 is a partial enlarged plan view of one shearing blades of the machine shown in FIG. 5.

FIG. 8 is a side view of the shearing machine shown in FIG. 5.

DESCRIPTION OF PREFERRED EMBODIMENTS OF THE INVENTION

Figure 1:
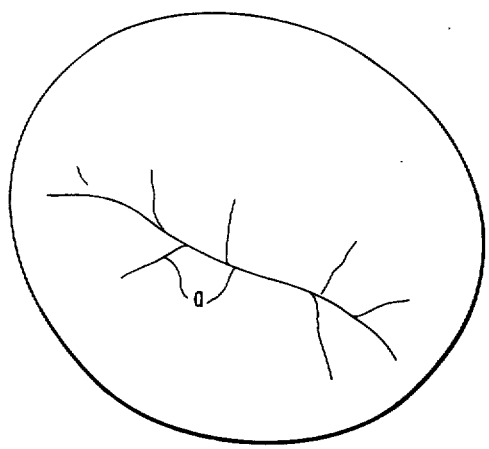
FIG. 1 is a sheared surface of the glass sheared by the conventional shearing method.
Figure 2:
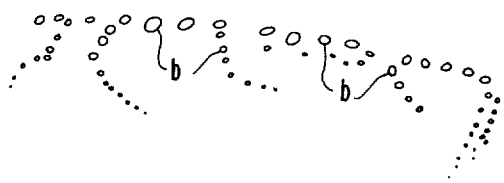
FIG. 2 is an enlarged view of the sheared surface of the glass of FIG. 1 showing the "shear marks."
Figure 3:
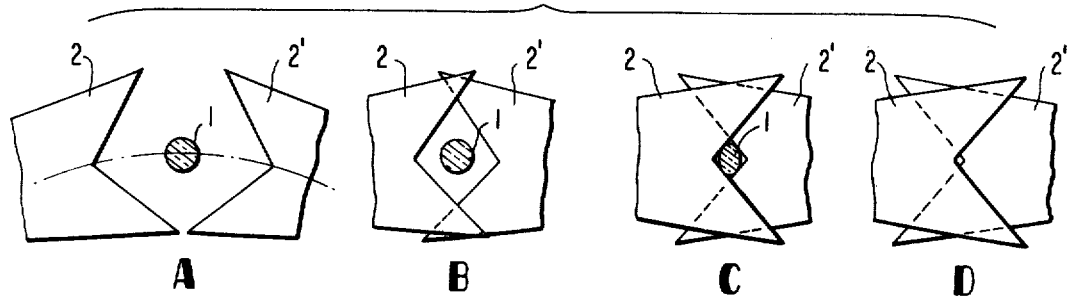
FIGS. 3A through 3D show a sequence of shearing steps used in the conventional shearing method.

FIGS. 3A through 3D show the conventional shearing method comprising a series of sequential shearing steps. The shearing of molten glass 1 is carried out by a convergence of both a pinching and a shearing with a pair of V-shaped blades which rotate in opposite directions along the same circle. The surface layer of the molten glass cooled and solidified by contact with the shear blades is sheared and pinched, so that the solidified surface layer is folded causing wrinkles and creases in the surfaces, thus entrapping air in the molten glass during the shearing. The air entrapped forms bubbles and exhibits the shear lines after shearing.

FIGS. 4A through 4D show the shearing method according to this invention, comprising a series of sequential shearing steps. A pair of chelae-like V-shaped shear blades 2,2' having mutually different rotating radii nip the molten glass 1 to shear the molten glass without squeezing. The mutually confronting edges of the shear blades 2,2' are preferably arranged parallel to each other, whereby the confronting edges slide parallel on the surface layer of the glass whereby the molten glass is not squeezed eccentrically.

Each of the shear blades 2,2' is V-shaped as is conventional defining in each case radially inward and radially outward blade edge intersecting portions at 2a, 2b, 2'a, 2'b. One of the edges of the V-shaped blade serves as a guide to facilitate a smooth nipping action of both of the blades. The same advantageous results are obtained using a pair of symmetrical V-shaped blades as is usually used. In such a case, the shear blades must be arranged in mutually different directions or the angles of the blade edges must be changed with respect to each other. In addition, the V-shaped blade must not have two edges, i.e., one side of the V-shaped blade serving as the guide may not have an inner edge. However, one cutting edge of the V-shaped blade can be shorter than the other edge, but, the shearing edge is preferably longer than that of the conventional blade.

Where the diameter of the outlet of the molten flowing glass 1 is 16 mm, the rotating radius of one shear blade 2 is made so that it is more than 10 mm longer than the rotating radius of the other shear blade 2', and the longer shear blade 2 is directed outwardly at an angle of about 3° from the rotating arc. Thus, the molten glass can be sheared without the convergence of squeezing of and forming of any eccentricity in the molten glass. The difference between the rotating radius of the left shear blade and the rotating radius of the right shear blade must be increased in accordance with the increase of the diameter of the outlet of the molten glass. The difference between the rotating radii can be large for shearing not only molten glass of a large diameter but also molten glass of a small diameter. Accordingly, where the diameter of the molten glass outlet is not changed frequently, several shear shanks having mutually different lengths are preferably provided for shearing the molten glass. If the length of the shear shank and the direction thereof are variable as in the examples hereinafter described, the shearing apparatus can be effectively employed in the shearing of molten glass of various diameters.

According to the shearing method of this invention, the depth of the sheared track of the molten glass is kept consistently below about 0.03 mm, and a depth of less than 0.05 mm can be ensured. The shear marks or lines are removed from the glass after cooling and solidification. Accordingly, the shearing method of this invention is very effective in eliminating the above described defects in the work in producing lenses, thus resulting in a reduction in the amount of glass chips and residue, and a saving in labor and cost. In addition, the attractive appearance and the commercial value of glass ware, such as tableware, is not diminished by the glass shearing method of this invention, since shear marks do not occur on the sheared surface.

Figure 5:
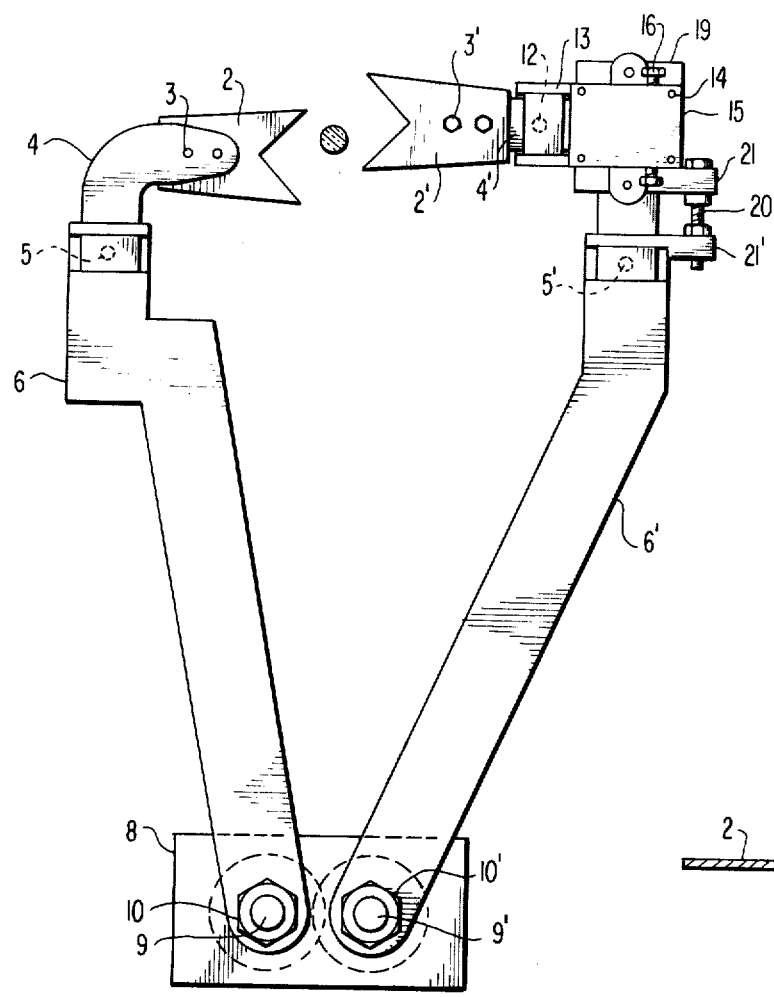
FIG. 5 is a plan view of an essential part of a shearing machine according to this invention.
Figure 6:
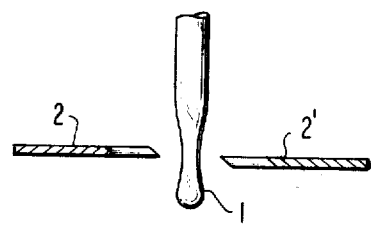
FIG. 6 is a partial cross sectional elevational view of the shearing blades and the molten flowing glass to be sheared as shown in FIG. 5.

The shearing machine according to this invention will be described with reference to FIGS. 5 to 9. In FIGS. 5 and 6, numeral 1 indicates a molten flowing glass, and numerals 2,2' indicate a pair of rotating shear blades each having a V-shaped shearing edge. The shear blade 2 is attached to a shank 4 by bolts 3, and the shank is fixed to an arm 6 by a bolt 5. The arm is attached by a nut 10 to a rotating shaft 9 projecting from a case 8 of an arm rotating mechanism (not shown).

Figure 9:
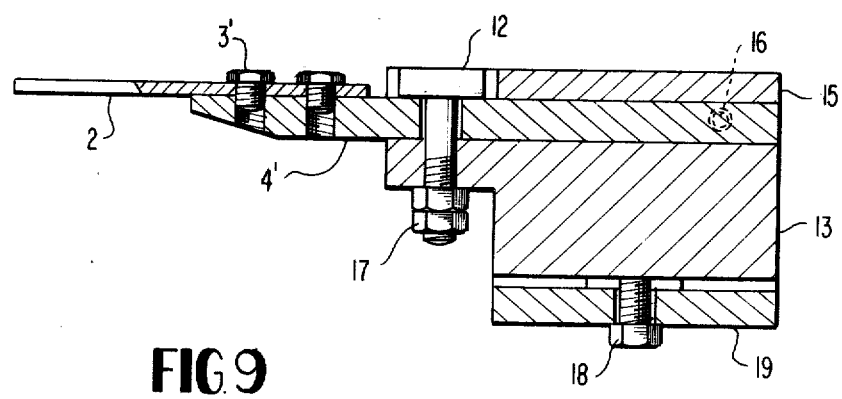
FIG. 9 is a cross sectional elevational view of the enlarged shearing blade shown in FIG. 7.

The other shear blade 2' is attached to a shank 4' by bolts 3', and the shank is attached to a shank base 13 by both a bolt 12 and a shank holding member 15 which is fixed to the shank base 13 by a bolt 14. The shank 4' is rotated about the bolt 12 by adjusting a bolt 16 (shown in FIG. 7) piercing through the shank base 13 to adjust the direction of the shear blade 2', so that the mutually confronting edge portions of both of the V-shaped blades 2,2' are made parallel to each other during the shearing operation such as 2a to 2'b and 2b to 2'a. After adjusting the direction, the shear blade 2' is fixed by a nut 17 as shown in FIG. 9.

The lower part of the shank base 13 is formed as a hemispherical pillar 13' and inserted into a recess 19' of a shank holder 19. The shank base 13 is rotated about a center axis of the hemipherical pillar by a bolt 18 penetrating through the shank base and the shank holder, thus bringing the sides of the shear blades 2,2' into sliding contact with each other.

The shank holder 19 has a flange 21 through which a bolt 20 penetrates. The bolt 21 further penetrates through a flange 21' of an arm 6' and is attached thereto. By rotating the bolt 21, the length of the shank holder 19 projecting from the arm 6' can be adjusted.

Figure 4:
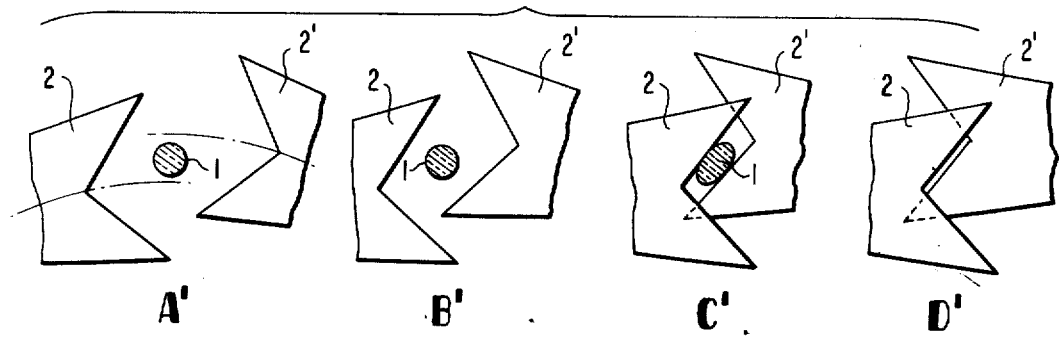
FIGS. 4A through 4D show a sequence of shearing steps used in the shearing method according to this invention.

Thus, the rotating radius of the shear blade 2' is made different from that of the shear blade 2, and the center of the V-shaped blade 2 radially overlaps that of the V shaped blade 2' as shown in FIG. 4, whereby the molten flowing glass 1 is sheared without a squeezing of the surface layer towards the interior. The difference in the rotating radius between the two shanks is preferably more than about 10 mm when the diameter of the flowing molten glass outlet is 16 mm. The difference between the rotating radii can be increased as the diameter of the flowing glass outlet increases. After adjusting the lengths of the shanks, the shank is fixed by fastening a nut 22. The shank holder 19 is fixed to the arm 6' by the bolt 5', and the arm is fixed to the rotating shaft 9' projecting from the case 8 by a nut 10'.

The glass shearing machine of this invention thus constructed drives the rotating shafts 9,9' by means of a conventional arm rotating mechanism thereby to rotate the arms 6,6' about their axes with the same velocity and angle in mutually opposite directions. Thus, the shear blades 2,2' are rotated to shear the molten flowing glass 1 with the mutually parallel and sliding edges of the blades without causing the converging squeezing of the glass. In addition, the depth of the sheared track is kept consistently at a value below 0.03 mm. Furthermore, the total length of the arm of the shear blade and to carry out the shearing of the molten flowing glass varies in accordance with the diameter of the molten flowing glass outlet.

While this invention has been described with reference to particular embodiments thereof, it will be understood that numerous modifications can be made by those skilled in the art without actually departing from the scope of the invention.

Therefore, the appended claims are intended to cover all such equivalent variations as comming within the true spirit and scope of the invention.

What is claimed is:

1. In an apparatus for shearing flowing molten glass including a pair of oppositely oriented chelae-like V-shaped blades confronting each other and attached to rotatable arms and means for rotating said arms such that said blades rotate in closely adjacent planes but in opposite directions with respect to each other, the improvement wherein:

said blades are fixed to said arms so as to rotate at mutually different radii such that the intersection of the blade edge portion for each blade do not meet during rotation to closed nip position.

2. The apparatus as claimed in claim 1, wherein: said blades are oriented with respect to said rotating arms such that mutually opposed blade edge portions of respective blades lie parallel to each other during the final rotation of said blades to closed nip position.

3. The apparatus as claimed in claim 1, wherein: the radially outward edge portion of the blade rotating about the shorter radius and the radially inward edge portion of the blade rotating about the larger radius comprise the cutting edges of respective blades, while the other blade edge portions of respective blades define guides for the flowing molten glass.

4. The apparatus as claimed in claim 1, wherein: one of said arms carries a shank holder at the outer end thereof, said shear blade is mounted on said shank holding member and extends generally at right angles to the axis thereof, and said apparatus further comprises means for adjusting the angular inclination of said shear blade about an axis parallel to the arm axis to permit positioning said blades in closely adjacent parallel planes and said apparatus further comprises means for adjusting the radial position of said shank holding member on said arm to vary the radius of rotation of one blade with respect to the other.

5. The apparatus as claimed in claim 4, wherein: said means for adjustably mounting said shear blade to said shank holding member comprises a V-shaped recess within the side of said shank holding member, said shear blade includes a hemispherical pillar shank portion received within the shank holder recess and is pivotably mounted with respect thereto, and an adjustment bolt threadably carried by said shank holding member bears on said shank for pivoting said shank about the pivot axis of said hemispherical pillar.

* * * * *